(12) United States Patent
Chhabra et al.

(10) Patent No.: US 11,921,645 B2
(45) Date of Patent: *Mar. 5, 2024

(54) SECURING DATA DIRECT I/O FOR A SECURE ACCELERATOR INTERFACE

(71) Applicant: Intel Corporation, Santa Clara, CA (US)

(72) Inventors: Siddhartha Chhabra, Portland, OR (US); Prashant Dewan, Portland, OR (US); Abhishek Basak, Bothell, WA (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,762

(22) Filed: Sep. 16, 2022

(65) Prior Publication Data
US 2023/0032740 A1    Feb. 2, 2023

Related U.S. Application Data

(63) Continuation of application No. 17/022,029, filed on Sep. 15, 2020, now Pat. No. 11,481,337, which is a continuation of application No. 16/023,661, filed on Jun. 29, 2018, now Pat. No. 10,783,089.

(51) Int. Cl.
| | |
|---|---|
| *G06F 21/60* | (2013.01) |
| *G06F 12/0831* | (2016.01) |
| *G06F 12/14* | (2006.01) |
| *G06F 13/28* | (2006.01) |
| *G06F 21/78* | (2013.01) |
| *G06F 21/85* | (2013.01) |

(52) U.S. Cl.
CPC ...... *G06F 12/1408* (2013.01); *G06F 12/0835* (2013.01); *G06F 12/1466* (2013.01); *G06F 13/28* (2013.01); *G06F 21/602* (2013.01); *G06F 21/78* (2013.01); *G06F 21/85* (2013.01); *G06F 2212/1052* (2013.01); *G06F 2212/402* (2013.01)

(58) Field of Classification Search
CPC ........ G06F 21/602; G06F 21/78; G06F 21/85; G06F 12/0835; G06F 12/1408; G06F 12/1466; G06F 2212/1052; G06F 2212/402; G06F 13/28
See application file for complete search history.

(56) References Cited

U.S. PATENT DOCUMENTS

2015/0269091 A1    9/2015 Horovitz et al.

*Primary Examiner* — Minh Dinh
(74) *Attorney, Agent, or Firm* — Alliance IP, LLC

(57) ABSTRACT

The present disclosure includes systems and methods for securing data direct I/O (DDIO) for a secure accelerator interface, in accordance with various embodiments. Historically, DDIO has enabled performance advantages that have outweighed its security risks. DDIO circuitry may be configured to secure DDIO data by using encryption circuitry that is manufactured for use in communications with main memory along the direct memory access (DMA) path. DDIO circuitry may be configured to secure DDIO data by using DDIO encryption circuitry manufactured for use by or manufactured within the DDIO circuitry. Enabling encryption and decryption in the DDIO path by the DDIO circuitry has the potential to close a security gap in modern data central processor units (CPUs).

18 Claims, 6 Drawing Sheets

SECURING DATA DIRECT I/O FOR A SECURE ACCELERATOR INTERFACE

CROSS-REFERENCE TO RELATED APPLICATIONS

This Application is a continuation (and claims the benefit of priority under 35 U.S.C. § 120) of U.S. application Ser. No. 17/022,029 filed on Sep. 15, 2020, and entitled SECURING DATA DIRECT I/O FOR A SECURE ACCELERATOR INTERFACE, which Application is a continuation of U.S. application Ser. No. 16/023,661 filed on Jun. 29, 2018, and entitled SECURING DATA DIRECT I/O FOR A SECURE ACCELERATOR INTERFACE. The disclosure of the prior application is considered part of and is hereby incorporated by reference in its entirety in the disclosure of this application.

TECHNICAL FIELD

The present disclosure relates to computing system security, in particular relates to increasing accelerator interface security.

BACKGROUND

The use of specialized hardware for performance and energy efficient computing is taking center stage for usages such as graphics processing, artificial intelligence, machine learning, and FPGAs. These advantages of specialized hardware are resulting in an explosion of hardware accelerator usage. In fact, some centralized processing units (CPUs) include integrated hardware accelerators or use hardware accelerators to improve overall data processing performance. However, the existing data encryption or security protections do not extend to accelerators. Because direct data input output (DDIO) channels enable hardware accelerators to obtain direct access to cache memory within a processor, insecure DDIO channels to hardware accelerators represent a security vulnerability and threat to secure computing.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
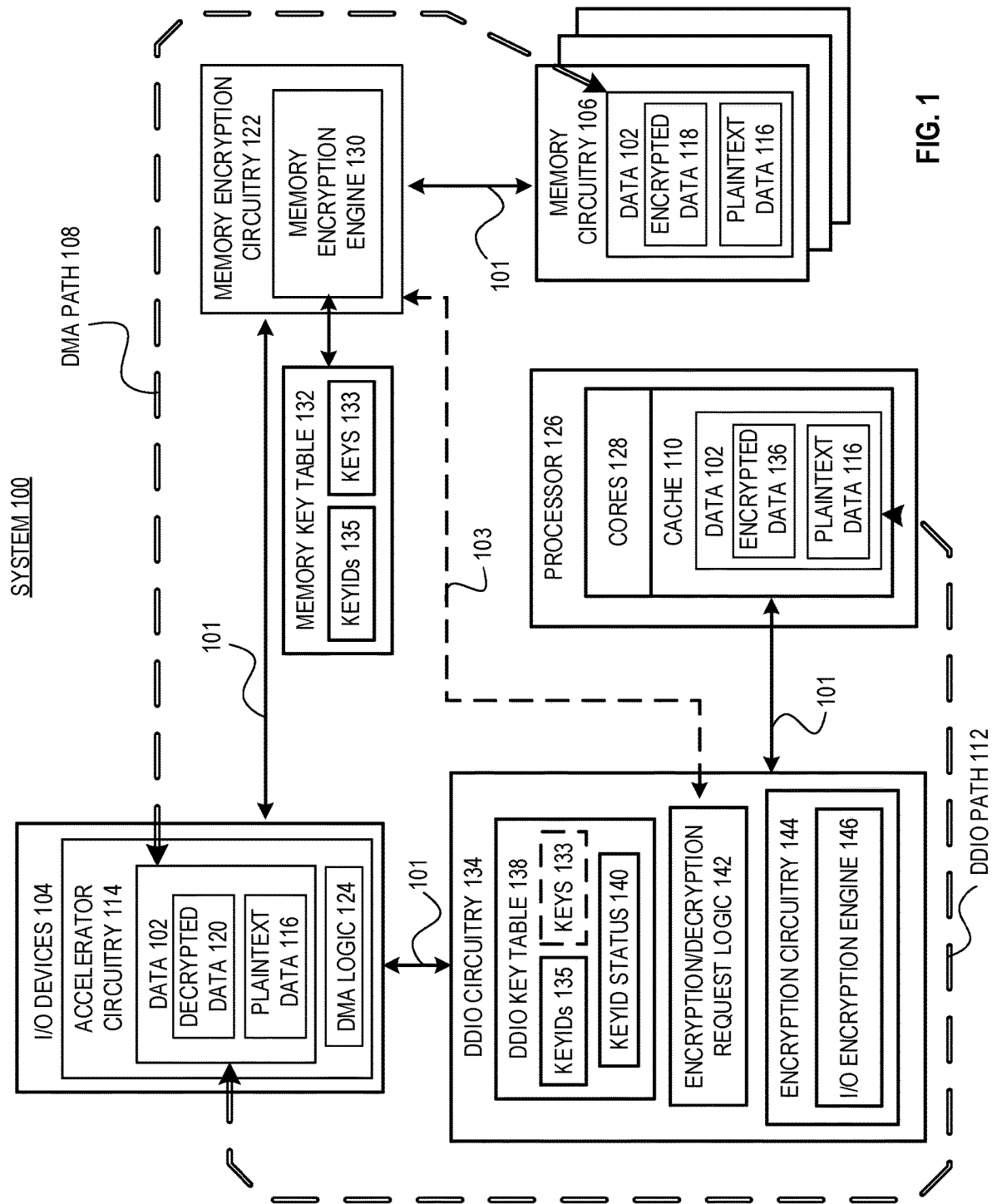
FIG. 1 is a block diagram of a system for securing data in data direct I/O (DDIO) communications, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Described herein are systems and methods for securing data direct I/O (DDIO) for a secure accelerator interface, in accordance with various embodiments. Historically, DDIO has enabled performance advantages that have outweighed its security risks. DDIO enables I/O devices (e.g., hardware accelerators) to read data directly from cache and store data directly to cache, without using direct memory access (DMA) paths and without first accessing (e.g., read/write) the data in main memory (e.g., RAM). Unfortunately, adversaries have become more creative in attacking computer systems, so the unencrypted DDIO communications between hardware accelerators and cache has really become an invitation for disaster. To resolve the security issue, some computer programs create a trusted execution environment and encrypt data that is stored in cache. While encrypting data stored in cache provides a security benefit, such encrypted storage hampers a computer program's ability to receive the benefits of hardware accelerators because the DDIO path and hardware accelerators are not traditionally equipped to encrypt and decrypt DDIO data.

According to an embodiment, DDIO circuitry secures DDIO data by using encryption circuitry that is manufactured for use in communications with main memory along the DMA path. The DDIO circuitry is configured to identify whether DDIO data is to be encrypted or decrypted. If the DDIO data is to be encrypted or decrypted, the DDIO circuitry is configured to transmit the DDIO data with an encryption or decryption request to the memory encryption circuitry for encryption operations. After the DDIO circuitry receives the DDIO data that has been encrypted or decrypted by the memory encryption circuitry, the DDIO circuitry proceeds to transfer the decrypted DDIO data to the hardware accelerator or proceeds to store the encrypted data in cache.

According to an embodiment, DDIO circuitry secures DDIO data by using DDIO encryption circuitry manufactured for use by or manufactured within the DDIO circuitry. When the DDIO receives DDIO data from a hardware accelerator, and the DDIO data is to be encrypted, the DDIO circuitry uses the DDIO encryption circuitry to apply one or more encryption keys and algorithms to the DDIO data prior to storing the DDIO data in cache. When the DDIO receives DDIO data from cache, and the DDIO data is to be decrypted, the DDIO circuitry uses the DDIO encryption circuitry to apply one or more encryption keys and algorithms to the DDIO data prior to transferring the DDIO data to the hardware accelerator.

Enabling encryption and decryption in the DDIO path by the DDIO circuitry closes a security gap in modern data central processor units (CPUs), according to various embodiments disclosed herein.

FIG. 1 is a block diagram of a system 100 that includes secure direct data input output (DDIO) communications between input output (I/O) devices and cache, according to an embodiment. The system 100 may include one or more of a variety of computing devices, including, but not limited to, a personal computer, a server, a laptop, a tablet, a phablet, a smartphone, a motherboard with a chipset, or some other computing device, according to various embodiments. The system 100 enables the secure transfer of data 102 between one or more I/O devices 104 and memory circuitry 106, along a direct memory access (DMA) path 108, according to an embodiment. The system 100 enables secure transfer and storage of the data 102 between the one or more I/O devices 104 and cache 110, along a DDIO path 112, according to an embodiment. By enabling secure transfer and storage of the data 102 between the I/O devices 104, the memory circuitry 106, and the cache 110, the system 100 enables secure operations, protects trusted execution environments, and reduces the likelihood that one or more untrusted programs will inadvertently access or acquire financial data, personally identifiable information (PII), and/or other secret data, according to various embodiments.

The one or more I/O devices 104 represent discrete off-die devices as well as integrated on-die devices, according to an embodiment. For example, the I/O devices 104 may include accelerator circuitry 114, according to an embodiment. The accelerator circuitry 114 may include hardware that is configured to efficiently perform a subset of tasks that may be performed faster or more efficiently than software executed on a general-purpose processor. The accelerator circuitry 114 may represent one or more hardware accelerators that may be manufactured on-die of a central processing unit (CPU), or may be a discrete device that is communicatively coupled to a CPU through one or more I/O ports and/or data ports, according to an embodiment. The accelerator circuitry 114 may include one or more of a variety of types of hardware accelerators, including, but not limited to, a machine learning accelerator, a graphical processing unit, a regular expression hardware accelerator for spam control in the server industry, a three-dimensional (3D) accelerator, and a cryptographic accelerator.

The memory circuitry 106 represents one or more of a variety of types of memory that may be used in the system 100, according to an embodiment. The memory circuitry 106 may be volatile memory, may be a non-volatile memory, or may be a combination of volatile memory and non-volatile memory, according to an embodiment. The volatile memory may include various types of random access memory (RAM), according to an embodiment. Non-volatile memory may include NAND memory, 3D crosspoint (3DXP), phase-change memory (PCM), hard disk drives, and the like, according to an embodiment.

The data 102 may be operated on or stored in the I/O devices 104 and in the memory circuitry 106. The data 102 may include plaintext data 116, encrypted data 118 and decrypted data 120. Plaintext data 116 includes data that is not encrypted, according to an embodiment. Encrypted data 118 is data that has had one or more encryption algorithms applied to it to obfuscate or otherwise decrease the likelihood that an unwanted recipient of the data can correctly interpret the information included therein. Decrypted data 120 is a type of plaintext data 116 that was encrypted at one point and that has been partially or fully decrypted, using one or more encryption or decryption algorithms, according to an embodiment.

The accelerator circuitry 114 includes direct memory access (DMA) logic 124 to enable the accelerator circuitry 114 to directly transfer data between the accelerator circuitry 114 and the memory circuitry 106, according to an embodiment. The DMA logic 124 may cause the accelerator circuitry 114 to initially request a DMA transfer (e.g., read and/or write) with the memory circuitry 106, according to an embodiment. The accelerator circuitry 114 may submit the request for the DMA transfer to the processor 126 (inclusive of a plurality of cores 128 and the cache 110), so that the processor 126 initiates the DMA transfer between the accelerator circuitry 114 and the memory circuitry 106, according to an embodiment. Once the DMA transfer is initiated, the DMA logic 124 may enable the accelerator circuitry 114 to directly transfer the data 102 between the memory circuitry 106, while bypassing the processor 126 and/or the cores 128, according to an embodiment.

The processor 126 may include any number and/or combination of currently available and/or future developed single- or multi-core central processing units. In embodiments, the processor 126 may include a general-purpose processor, such as a Core® i3, i5, i7, 2 Duo and Quad, Xeon®, Itanium®, Atom®, or Quark® microprocessor, available from Intel® (Intel Corporation, Santa Clara, CA). Alternatively, the processor 126 may include one or more processors from another manufacturer or supplier, such as Advanced Micro Devices (AMD®, Inc.), ARM Holdings® Ltd, MIPS®, etc. The processor 126 may include a special-purpose processor, such as, for example, a network or communication processor, compression engine, graphics processor, co-processor, embedded processor, or the like. The processor 126 may be implemented as a single semiconductor package or as a combination of stacked or otherwise interconnected semiconductor packages and/or dies. The processor 126 may be a part of and/or may be implemented on one or more substrates using any of a number of process technologies, such as, for example, BiCMOS, CMOS, or NMOS.

The system 100 secures data transfers along the DMA path 108 by using memory encryption circuitry 122, according to an embodiment. The memory encryption circuitry 122 is configured to selectively encrypt the data 102 as it is transferred from the accelerator circuitry 114 to the memory circuitry 106, according to an embodiment. The memory encryption circuitry 122 may be configured to convert the plaintext data 116 from the accelerator circuitry 114 into the encrypted data 118 stored in the memory circuitry 106, according to an embodiment. The memory encryption circuitry 122 is configured to selectively decrypt the data 102 as it is transferred from the memory circuitry 106 to the accelerator circuitry 114, according to an embodiment. The memory encryption circuitry 122 may be configured to convert the encrypted data 118 in the memory circuitry 106 into the decrypted data 120 that is stored or operated on by the accelerator circuitry 114, according to an embodiment.

To perform encryption and decryption, the memory encryption circuitry 122 may use a memory encryption engine 130 and a memory key table 132. The memory encryption engine 130 may include logic that executes one or more encryption algorithms and one or more decryption algorithms by applying one or more encryption keys to the data 102 to encrypt and/or decrypt the data 102, according to an embodiment.

The memory encryption engine 130 can determine which encryption key to apply to the data 102 by using the memory key table 132. The memory key table 132 includes keys 133 and key identifiers (keyIDs) 135, according to an embodiment. The keyIDs 135 are mapped to the keys 133 and may be used to look up which of the keys 133 to apply to an encryption or decryption operation.

The memory encryption engine 130 uses parts of a memory address for the data 102 to determine a keyID for the data 102. In an embodiment, the memory encryption engine 130 (and/or the entire system 100) uses one or more most significant bits in the memory address of the data 102 to determine the keyID to use to encrypt the data 102. The keyID is used to identify one of the keyIDs 135, which is used to identify one of the keys 133 in the memory key table 132, according to an embodiment. As an illustrative example, Table 1 shows that one of the keyIDs 135 may be identified from non-canonical or otherwise available bits (e.g., the most significant 3 bits) within a virtual or physical memory address.

TABLE 1

| Virtual or Physical Memory Address | Description |
| --- | --- |
| addr[63:61] | 3 bits used to identify up to 8 encryption keys |
| addr[60:36] | Other use |
| addr[35:0] | Physical memory addressing (e.g., index, tag, offset, etc.) |

For a number of years, accelerators (i.e., hardware accelerators) have been allowed to read and store plaintext data to cache, and have long represented an unpatched security vulnerability in CPU architecture. The system 100 includes DDIO circuitry 134 that enables the accelerator circuitry 114 use the DDIO path 112 to read, write, and/or operate on encrypted data 136 stored in the cache 110, according to an embodiment. Some trusted programs or trusted execution environments (TEE) store encrypted data 136 in the cache 110 and store encrypted data 118 in the memory circuitry 106, according to an embodiment. Historically, the encrypted data 136 that was transferred to the accelerator circuitry 114 over the DDIO path 112, was not decrypted and was historically useless to the accelerator circuitry 114 because accelerators lack decryption circuitry and/or lack access to the keys 133 used by trusted programs to encrypt the encrypted data 136.

The DDIO circuitry 134 is configured to enable the accelerator circuitry 114 to bypass the DMA path 108 and to read the encrypted data 136 directly from the cache 110 and to write the encrypted data 136 directly to the cache 110. In other words, the DDIO circuitry 134 enables the accelerator circuitry 114 (and other I/O devices 104) to, without first accessing the memory circuitry 106, write and read the encrypted data 136 to/from the cache 110. An access (e.g., read and/or write) of the memory circuitry 106 by the accelerator circuitry 114 can consume hundreds of clock cycles. By contrast, an access of cache 110 by the accelerator circuitry 114 may consume, for example, tens of clock cycles. Thus, communications between the accelerator circuitry 114 and the cache 110 over the DDIO path 112 substantially improves the performance of the accelerator circuitry 114 because the access latency is significantly less. By enabling encryption along the DDIO path 112 for I/O devices 104, the DDIO circuitry 134 improves security of the DDIO path 112 while preserving the speed advantages provided by DDIO technology.

The DDIO circuitry 134 may be configured to use different techniques to encrypt and decrypt the data 102 in the cache 110 for the accelerator circuitry 114 (or for other I/O devices 104), while sustaining the performance benefits of DDIO. With one technique, the DDIO circuitry 134 may use existing encryption circuitry (e.g., the memory encryption circuitry 122) to encrypt and decrypt the encrypted data 136 for the accelerator circuitry 114. With another technique, the DDIO circuitry 134 may use native DDIO encryption circuitry (e.g., that is included in the DDIO circuitry 134) to encrypt and decrypt the encrypted data 136 for the accelerator circuitry 114, according to an embodiment. To enable encryption along the DDIO path 112, the DDIO circuitry 134 may include one or more of a DDIO key table 138, encryption/decryption request logic 142, and/or encryption circuitry 144, according to an embodiment.

The DDIO circuitry 134 may use the DDIO key table 138 to enable the DDIO circuitry 134 to identify the encryption or keyID status 140 of the data 102. The DDIO circuitry 134 may be configured to identify keyIDs 135 of the data 102. The DDIO key table 138 may then check the keyID status 140 for the keyIDs 135 of the data 102. If the keyID status 140 indicates that the data 102 is unencrypted, then the DDIO circuitry 134 may be configured to skip attempts to encrypt or decrypt the data 102. If the keyID status 140 (for a keyID) indicates that the keyID has been assigned to one of the keys 133, the DDIO circuitry 134 may perform operations to encrypt or decrypt the data 102 associated with the keyID having a status of being encrypted. The DDIO circuitry 134 may update the DDIO key table 138 as the keyID status 140 changes for any of the keyIDs 135.

The DDIO key table 138 may include the keys 133 with which the keyIDs 135 are associated. The keys 133 may be stored in the memory key table 132 that is used by the memory encryption circuitry 122. The keys 133 may be stored in the DDIO key table 138 for use by the encryption circuitry 144, according to an embodiment.

The DDIO circuitry 134 may include and use the encryption/decryption request logic 142 to secure the data 102 along the DDIO path 112, according to an embodiment. The encryption/decryption request logic 142 may enable the DDIO circuitry 134 to send the data 102, with an encryption/decryption request, to the memory encryption circuitry 122 for encryption or decryption. The encryption/decryption request logic 142 may include, the keyID, an encryption request, a decryption request, a memory address and/or the data 102 to the memory encryption circuitry 122, to perform the encryption or decryption operation. After the memory encryption circuitry 122 performs an encryption or decryption operation for the DDIO circuitry 134, the memory encryption circuitry 122 may be configured to return the encrypted or decrypted version of the data 102 to the encryption/decryption request logic 142 or to the DDIO circuitry 134. Upon receipt of the encrypted or decrypted version of the data 102 from the memory encryption circuitry 122, the DDIO circuitry 134 transfers the data 102 along the DDIO path 112 to the accelerator circuitry 114 or to the cache 110.

The DDIO circuitry 134 may include encryption circuitry 144 that enables the DDIO circuitry 134 to encrypt and decrypt the data 102 without relying on the memory encryption circuitry 122, according to an embodiment. Using the DDIO key table 138, the DDIO circuitry 134 may determine that data 102 needs decryption or encryption. The DDIO circuitry 134 may apply an I/O encryption engine 146 to the data 102 to encrypt or decrypt the data 102 for the accelerator circuitry 114, according to an embodiment. The I/O encryption engine 146 may identify the keyIDs 135 of the data 102 to determine which of the keys 133 are relevant to the data 102. The I/O encryption engine 146 may apply one or more of the keys 133 and one or more encryption algorithms (e.g., AES-XTS) to the data 102 to encrypt or decrypt the data 102 along the DDIO path 112 between the cache 110 and the accelerator circuitry 114, according to an embodiment. In one embodiment, the DDIO circuitry 134 uses the I/O encryption engine 146 to encrypt the plaintext data 116 from the accelerator circuitry 114, to convert the plaintext data 116 into the encrypted data 136, prior to storing the encrypted data 136 in the cache 110. In one embodiment, the DDIO circuitry 134 uses the I/O encryption engine 146 to decrypt the encrypted data 136 from the cache 110, to convert the encrypted data 136 into the plaintext data 116, prior to storing the plaintext data 116 in the accelerator circuitry 114.

The components of the system 100 may be communicatively coupled and/or physically coupled together with a number of communications channels 101 (e.g., electronic traces, electronic buses, etc.). The DDIO circuitry 134 may be configured to use one or more of the communications channels 101 to communicate with the memory encryption circuitry 122. In an embodiment, the DDIO circuitry 134 uses a communications channel 103 to communication with the memory encryption circuitry 122. The communications channel 103 may provide the DDIO circuitry 134 with direct access to the memory encryption circuitry 122, to facilitate use of the encryption and decryption capabilities of the memory encryption circuitry 122 by the DDIO circuitry 134.

The DDIO circuitry 134 may use a number of techniques to secure data communications between the accelerator circuitry 114 (or other I/O devices 104) and the cache 110. While two different techniques are disclosed here, the DDIO circuitry 134 may be configured to use other techniques as well, or variations on the disclosed techniques, to encrypt and/or decrypt data on behalf of the accelerator circuitry 114, according to various embodiments.

Figure 2:
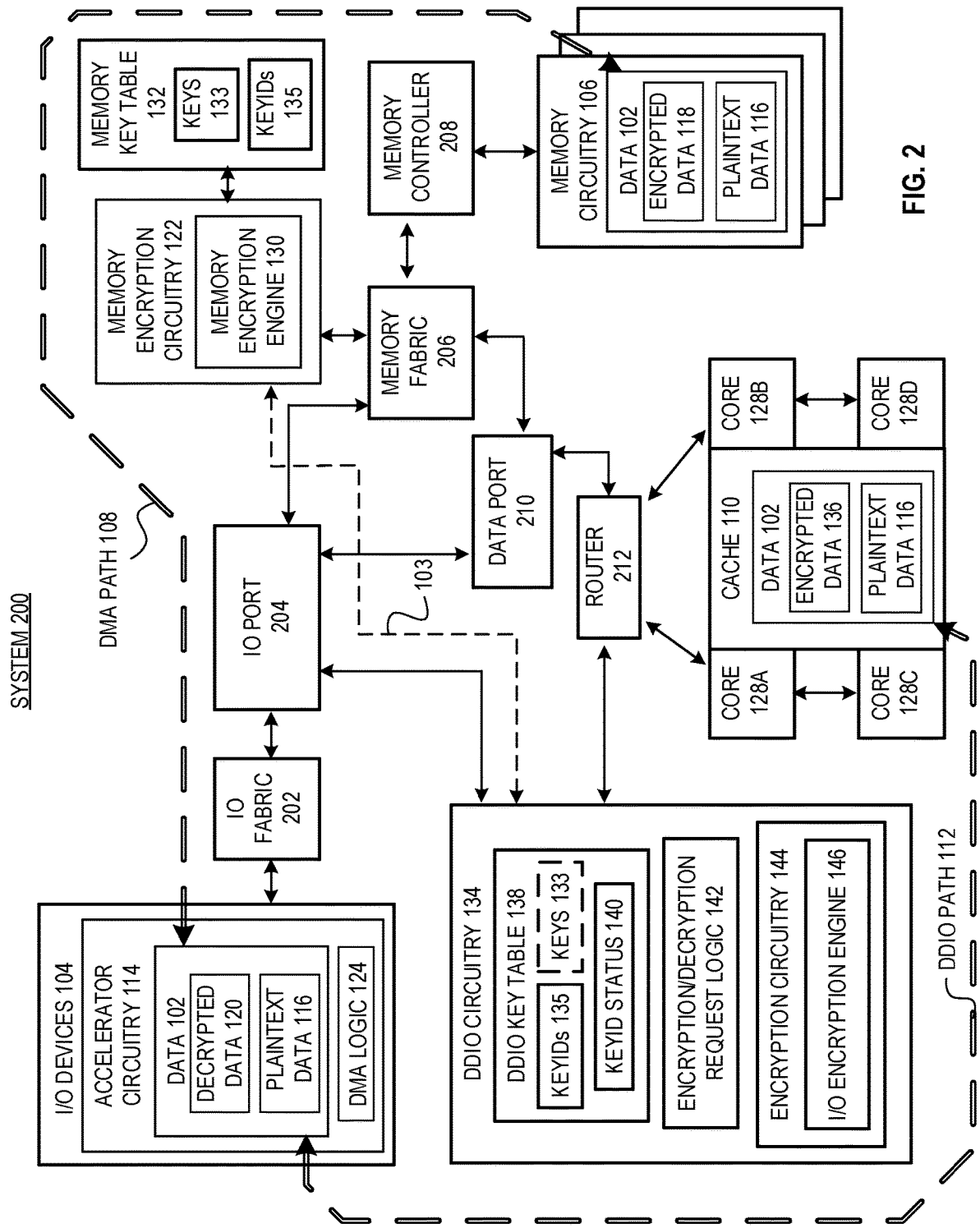
FIG. 2 is a block diagram of a system for securing data in data direct I/O (DDIO) communications, in accordance with at least one embodiment described herein.

FIG. 2 is a block diagram of a system 200 that includes secure DDIO communications between the I/O devices 104 and the cache 110, according to an embodiment. The system 200 is an example implementation of the system 100, according to an embodiment. The system 200 illustrates various sub-components of the communications channel 101 (shown in FIG. 1), according to an embodiment. The communications channel 101 may include, but is not limited to, I/O fabric 202, I/O ports 204, memory fabric 206, a memory controller 208, data ports 210, and a router 212, according to an embodiment. The I/O fabric 202 may include hardware, firmware, and software that enables I/O devices 104 to communicate with the I/O ports 204. The I/O ports 204 may include hardware and firmware that enable the system 200 to communicate with internal or external sub-systems or components. The memory fabric 206 may include hardware, firmware, and software that enables the memory controller 208 and the memory circuitry 106 to communicate with other components or sub-systems of the system 200. The memory controller 208 includes hardware and firmware to facilitate communication between the I/O devices 104, the cores 128 (individually, core 128A, core 128B, core 128C, core 128D, etc.), the cache 110, and the memory circuitry 106. The data ports 210 may include hardware and firmware that enables data communications with the cores 128 and other components within the system 200. The router 212 may provide an interface between system on a chip (SoC) components and the cores 128 and the cache 110. The router 212 may be a communication connection between a northbridge and a southbridge of a chipset or of an integrated processor die.

Figure 3:
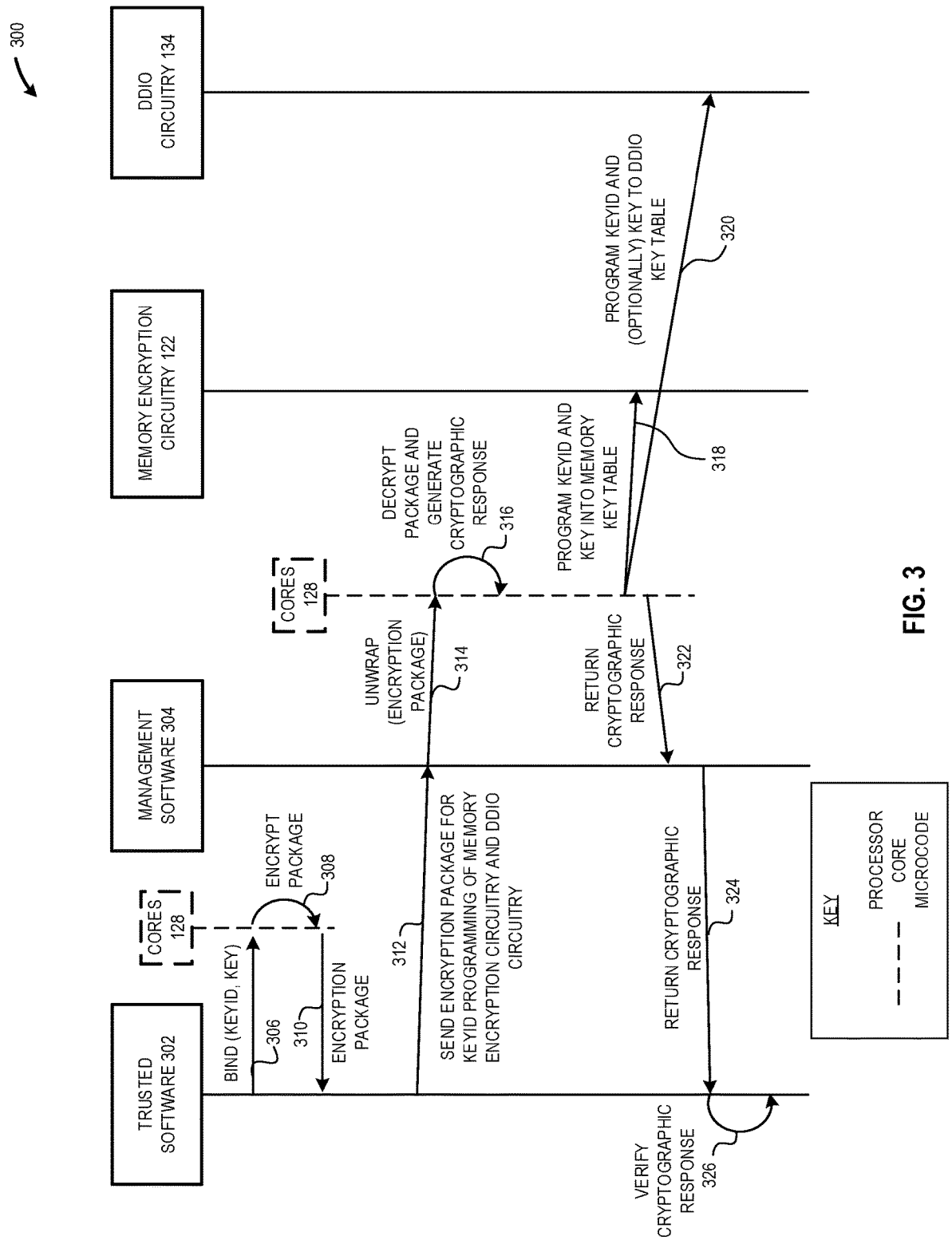
FIG. 3 is a flow diagram of a process for associating keyIDs with keys in a system of FIG. 1 and FIG. 2, in accordance with at least one embodiment described herein.

FIG. 3 illustrates a process 300 for associating the keyIDs 135 with the keys 133 in the system 100, according to an embodiment. The process 300 associates the keyIDs 135 with the keys 133 and by programming the memory encryption circuitry 122 and the DDIO circuitry 134 with the keyIDs 135 and with the keys 133, according to an embodiment. The process 300 includes interactions between a trusted software 302, a management software 304, the memory encryption circuitry 122, the DDIO circuitry 134, and one or more of the cores 128, according to an embodiment. The trusted software 302 represents a computer program that uses encryption one or more encryption keys to store, transmit, or otherwise perform secure operations, according to an embodiment. The management software 304 represents an operating system, a virtual machine, a virtual machine manager, or the like, according to various embodiments.

At operation 306, the trusted software 302 executes a bind command, according to an embodiment. The bind command may include identification or selection of a keyID and a key. The key may be selected, generated, or pseudo-randomly generated by the trusted software 302. The bind command may be used to wrap or encrypt the keyID and the selected key into an encryption package that is secret from (unreadable by) untrusted software, such as the management software 304, according to an embodiment.

At operation 308, one or more cores 128 encrypts the package of the keyID and the key, according to an embodiment. The one or more cores 128 may encrypt the package of the keyID and the key with one or more encryption algorithms and/or encryption keys that are known only to the cores 128, according to an embodiment. The bind command may be called or executed by software. The bind command represents instructions that are executed by the one or more cores 128 may represent an operation that is performed by firmware (e.g., processor microcode) that is inaccessible to software programs. In one embodiment, the instructions that are used to represent the bind command are microcode that are executed on a single core of the one or more cores 128.

At operation 310, the one or more cores provide the encryption package to the trusted software 302, according to an embodiment. The one or more cores 128 may provide encryption package to the trusted software 302 by identifying memory locations/pointers to the trusted software 302 may use to copy, transfer, or otherwise access the encryption package.

At operation 312, the trusted software 302 sends the encryption package to the management software 304 to enable the keyID to be programmed in the memory encryption circuitry 122 and in the DDIO circuitry 134, according to an embodiment.

At operation 314, the management software 304 executes an unwrap command on the encryption package, according to an embodiment. The unwrap command may include providing the encryption package with the unwrap command to one or more of the cores 128. The unwrap command may represent instructions that are executed by the one or more cores 128. The instructions for the unwrap command may be microcode that is executed by a single core of the one or more cores 128.

At operation 316, one or more of the cores 128 decrypts the encryption package and generates a cryptographic response, according to an embodiment. The one or more cores 128 may decrypt the encryption package using one or more keys and/or encryption algorithms that are known to the cores 128 and that are inaccessible to software programs, except through API.

At operation 318, one or more of the cores 128 programs the keyID and the key from the encryption package into the memory key table or otherwise into the memory encryption circuitry 122, according to an embodiment. Programming the keyID and the key into the memory encryption circuitry 122 enables the memory encryption circuitry 122 to apply the keys 133 to the correct keyIDs 135 during encryption and decryption operations, according to an embodiment.

At operation 320, one or more of the cores 128 programs the key ID and (optionally) the key from the encryption package into the DDIO key table or otherwise into the DDIO circuitry 134, according to an embodiment. Programming the keyID into the DDIO key table or otherwise into the DDIO circuitry 134 may enable the DDIO circuitry 134 to transmit encryption and/or decryption requests to the memory encryption circuitry 122. Programming the keyID into the DDIO key table or otherwise into the DDIO circuitry 134 may enable the DDIO circuitry 134 to correctly perform encryption and/or decryption operations within the DDIO path 112 (shown in FIG. 1) without relying on the memory encryption circuitry 122.

At operation 322, the one or more cores 128 returns the cryptographic response to the management software 304, which is responsive to the unwrap command, according to an embodiment. The cryptographic response may be a verification that the unwrap command was successfully executed by one or more of the cores 128.

At operation 324, the management software 304 returns a cryptographic response to the trusted software 302, to enable the trusted software 302 to verify that the keyID and the key were programmed into the memory encryption circuitry 122 and into the DDIO circuitry 134, according to an embodiment.

At operation 326, the trusted software 302 verifies the cryptographic response, according to an embodiment.

The process 300 enables the trusted software 302 to select a key, and map the selected key to a keyID, without the key being known to the management software 304 or other untrusted software programs running within the system 100, according to an embodiment. The programming of the key and key ID also enables the DDIO circuitry 134 to identify keyIDs 135 that have been associated with encrypted data, to enable the DDIO circuitry 134 to use the memory encryption circuitry 122 to encrypt and decrypt data, or to enable the DDIO circuitry 134 to encrypt or decrypt data, according to an embodiment.

Figure 4:
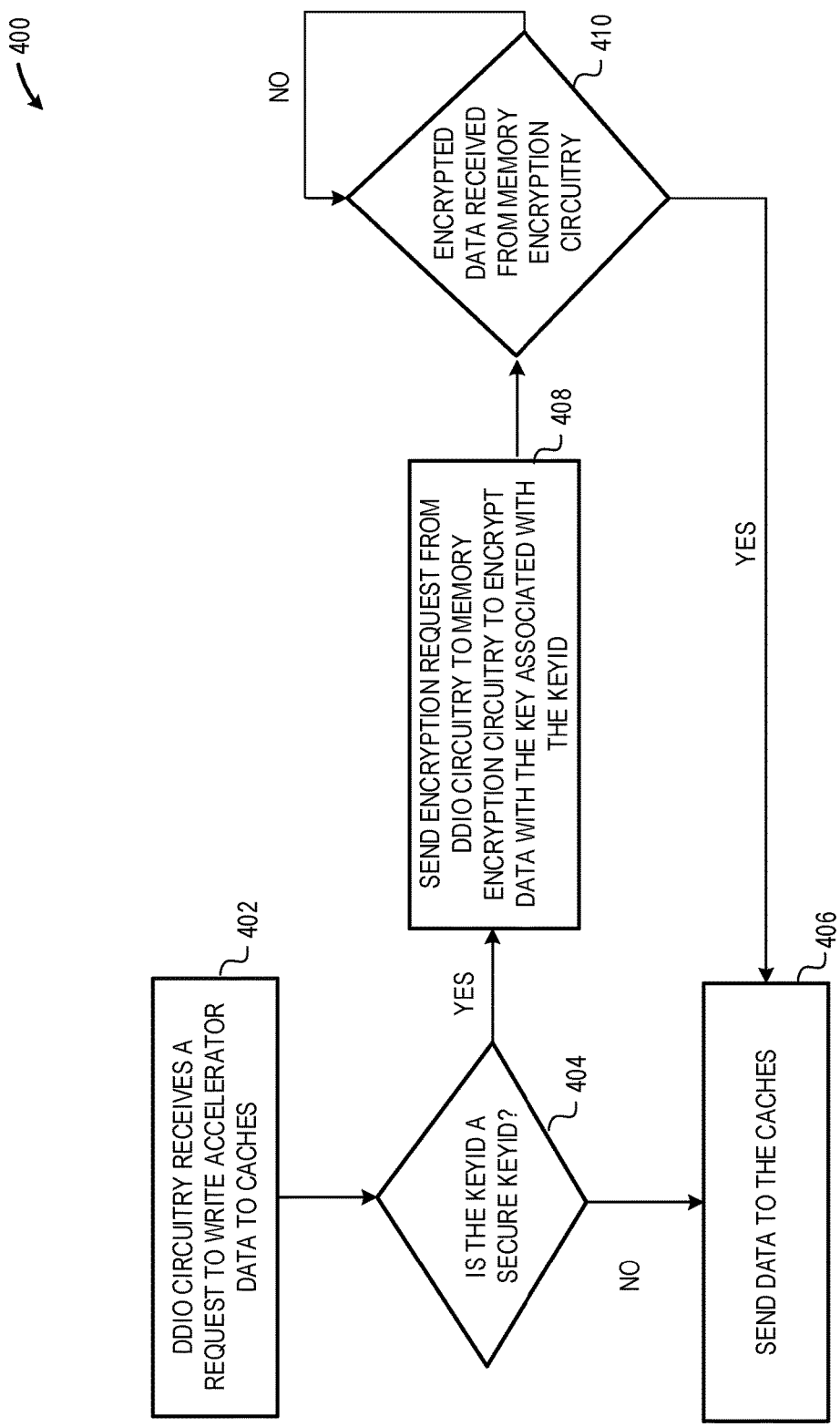
FIG. 4 is a flow diagram of a process for encrypting DDIO data, in accordance with at least one embodiment described herein.

FIG. 4 illustrates a process 400 for DDIO circuitry to use memory encryption circuitry to perform encryption operations on DDIO data being transferred from accelerator circuitry to cache, according to an embodiment.

At operation 402, DDIO circuitry receives the request to write accelerator data to one or more caches, according to an embodiment.

At operation 404, the process 400 determines if a key ID associated with the data is a secure keyID, according to an embodiment. If the keyID is not a secure keyID, the process 400 proceeds to operation 406, according to an embodiment. If the keyID is a secure keyID, the process 400 proceeds to operation 408, according to an embodiment.

At operation 406, the DDIO circuitry sends the data to the one or more caches, according to an embodiment.

At operation 408, the DDIO circuitry sends an encryption request from the DDIO circuitry to the memory encryption circuitry to encrypt the data with the key associated with the keyID, according to an embodiment.

At operation 410, the DDIO circuitry determines whether encrypted data has been received from the memory encryption circuitry, according to an embodiment. If not, operation 410 remains on operation 410, according to an embodiment. If encrypted data is received, operation 410 proceeds to operation 406, according to an embodiment.

Figure 5:
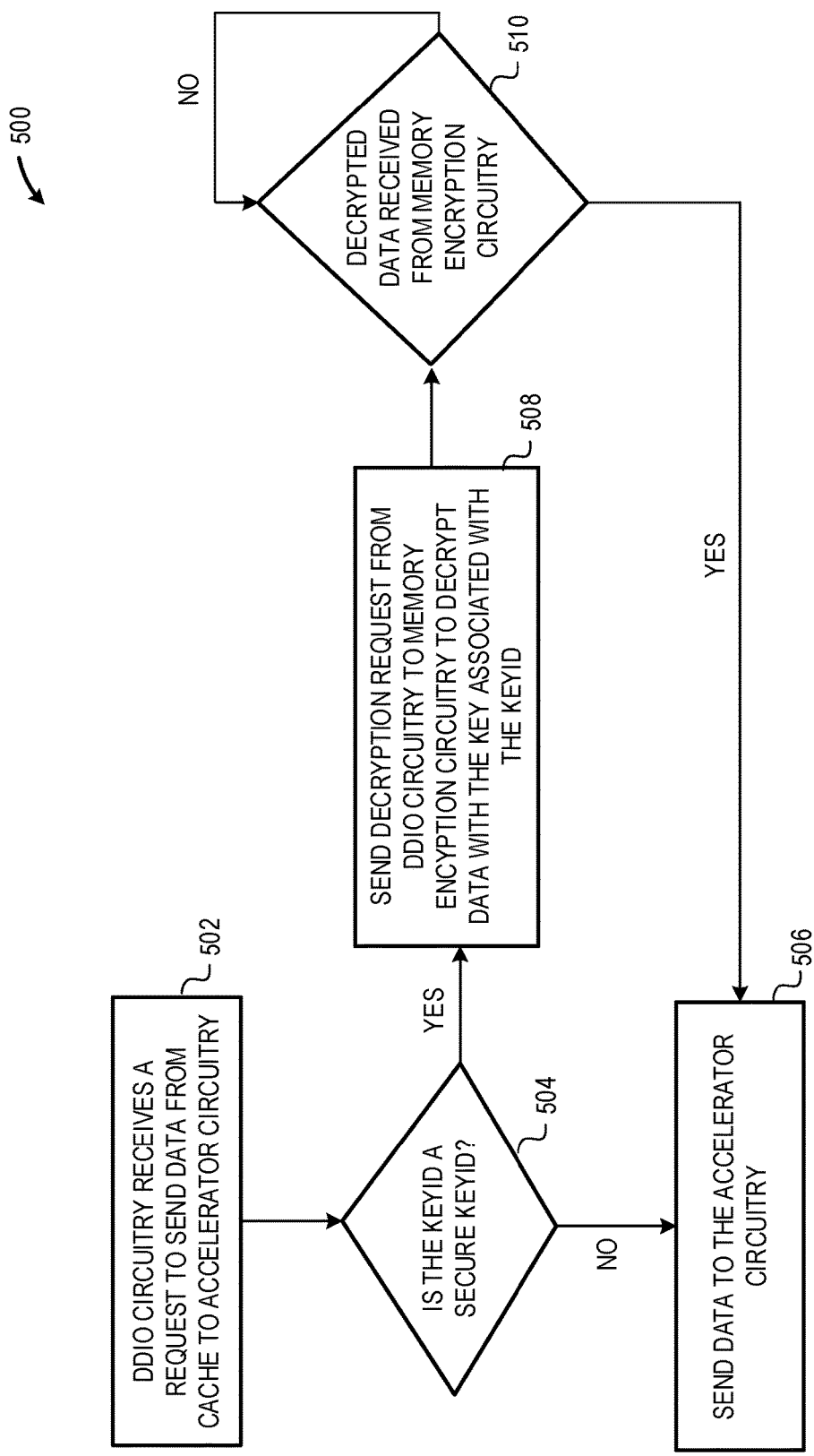
FIG. 5 is a flow diagram of a process for decrypting DDIO data, in accordance with at least one embodiment described herein.

FIG. 5 illustrates a process 500 for DDIO circuitry to use memory encryption circuitry to perform decryption operations on DDIO data being transferred from cache to the accelerator circuitry, according to an embodiment.

At operation 502, DDIO circuitry receives the request to send data from to one or more caches to accelerator circuitry, according to an embodiment.

At operation 504, the process 500 determines if a key ID associated with the data is a secure keyID, according to an embodiment. If the keyID is not a secure keyID, the process 500 proceeds to operation 506, according to an embodiment. If the keyID is a secure keyID, the process 500 proceeds to operation 508, according to an embodiment.

At operation 506, the DDIO circuitry sends the data to the accelerator circuitry, according to an embodiment.

At operation 508, the DDIO circuitry sends a decryption request from the DDIO circuitry to the memory encryption circuitry to decrypt the data with the key associated with the keyID, according to an embodiment.

At operation 510, the DDIO circuitry determines whether decrypted data has been received from the memory encryption circuitry, according to an embodiment. If not, operation 510 remains on operation 510, according to an embodiment. If decrypted data is received, operation 510 proceeds to operation 506, according to an embodiment.

Figure 6:
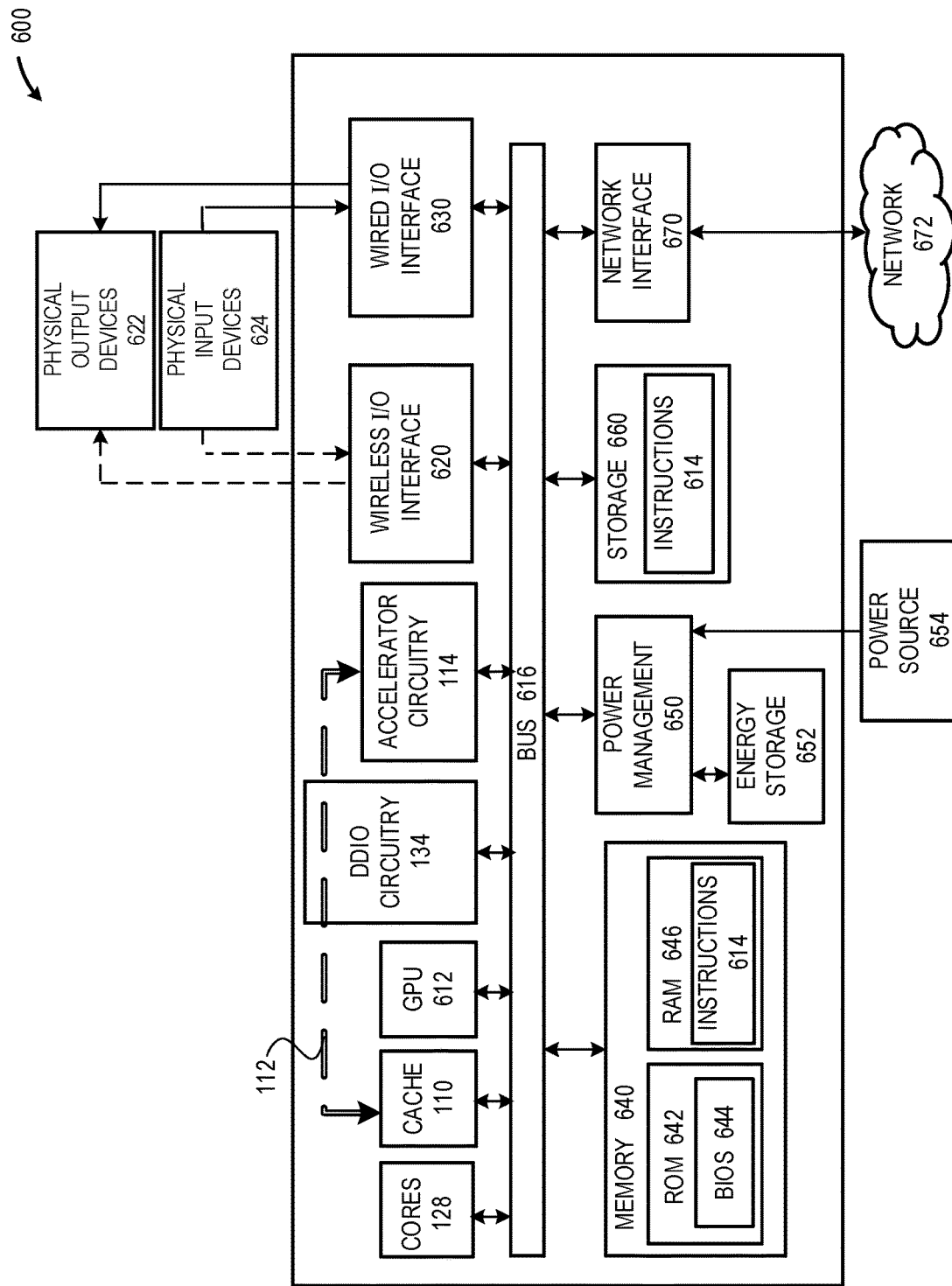
FIG. 6 is a block diagram of a system for securing data in DDIO communications, in accordance with at least one embodiment described herein.

FIG. 6 is a schematic diagram of an illustrative electronic, processor-based, device 600 that includes DDIO circuitry 134 configured to encrypt and decrypt data between the accelerator circuitry 114 and the cache 110 along the DDIO path 112, in accordance with at least one embodiment described herein. The processor-based device 600 may additionally include one or more of the following: processor cores 128, a graphical processing unit 612, a wireless input/output (I/O) interface 620, a wired I/O interface 630, memory circuitry 640, power management circuitry 650, non-transitory storage device 660, and a network interface 670. The following discussion provides a brief, general description of the components forming the illustrative processor-based device 600. Example, non-limiting processor-based devices 600 may include: smartphones, wearable computers, portable computing devices, handheld computing devices, desktop computing devices, blade server devices, workstations, and similar.

In embodiments, the processor-based device 600 includes processor cores 128 capable of executing machine-readable instruction sets 614, reading data and/or instruction sets 614 from one or more storage devices 660 and writing data to the one or more storage devices 660. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 128 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 600 includes a bus or similar communications link 616 that communicably couples and facilitates the exchange of information and/or data between various system components including the processor cores 128, the cache 110, the graphics processor circuitry 612, accelerator circuitry 114, one or more wireless I/O interfaces 620, one or more wired I/O interfaces 630, one or more storage devices 660, and/or one or more network interfaces 670. The processor-based device 600 may be referred to in the singular herein, but this is not intended to limit the embodiments to a single processor-based device 600, since in certain embodiments, there may be more than one processor-based device 600 that incorporates, includes, or contains any number of communicably coupled, collocated, or remote networked circuits or devices.

The processor cores 128 may include any number, type, or combination of currently available or future developed devices capable of executing machine-readable instruction sets. The processor cores 128 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 616 that interconnects at least some of the components of the processor-based device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the processor-based device 600, for example by causing the processor cores 128 to load and/or execute one or more machine-readable instruction sets 614. In embodiments, at least some of the one or more machine-readable instruction sets 614 cause at least a portion of the processor cores 128 to provide, create, produce, transition, and/or function as a dedicated, specific, and particular machine, for example a word processing machine, a digital image acquisition machine, a media playing machine, a gaming system, a communications device, a smartphone, or similar.

The processor-based device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The processor-based device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 1394 ("Fire-Wire"), and similar.

The processor-based device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the processor-based device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor cores 128 and/or graphics processor circuitry 612 and/or one or more applications executed on or by the processor cores 128 and/or graphics processor circuitry 612. In some instances, one or more data storage devices 660 may be communicably coupled to the processor cores 128, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or WiFi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor cores 128 and/or graphics processor circuitry 612. The processor-readable instruction sets 614 may include machine-readable and/or processor-readable code, instructions, or similar logic capable of providing the speech coaching functions and capabilities described herein.

The processor-based device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the processor-based device 600. The power source 654 may include, but is not limited to, a solar power system, a commercial electric grid, a portable generator, an external energy storage device, or any combination thereof.

For convenience, the processor cores 128, the graphics processor circuitry 612, the wireless I/O interface 620, the wired I/O interface 630, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 128 and/or the graphics processor circuitry 612. In some embodiments, all or a portion of the bus 616 may be omitted and the components are coupled directly to each other using suitable wired or wireless connections.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for forming magnetically lined through-holes in a semiconductor package substrate.

EXAMPLES

Examples of the present disclosure include subject material such as a method, a device, an apparatus, or a system related to protecting computing systems against memory replay attacks, as discussed below.

Example 1. According to this example, there is provided an apparatus. The apparatus includes a plurality of processor cores; cache memory communicatively coupled to one or more of the plurality of processor cores; and data direct input output (DDIO) circuitry to transfer DDIO data between the cache memory and accelerator circuitry, wherein the DDIO circuitry to encrypt and decrypt the DDIO data for the accelerator circuitry.

Example 2. This example includes the elements of example 1, further comprising: memory encryption circuitry to encrypt and decrypt data stored in memory, wherein the DDIO circuitry to transmit encryption requests and decryption requests to the memory encryption circuitry to encrypt and decrypt the DDIO data.

Example 3. This example includes the elements of example 2, wherein the DDIO circuitry to identify a keyID of the DDIO data, the DDIO circuitry to provide the keyID of the DDIO data to the memory encryption circuitry to encrypt and decrypt the DDIO data.

Example 4. This example includes the elements of example 3, wherein the DDIO circuitry to maintain a DDIO key table, wherein the DDIO key table to store a plurality of keyIDs and a plurality of statuses for the keyIDs to determine if DDIO data is to be encrypted or decrypted.

Example 5. This example includes the elements of example 4, wherein the DDIO key table stores keys associated with each of the plurality of keyIDs.

Example 6. This example includes the elements of example 1, further comprising: I/O encryption circuitry to encrypt and decrypt DDIO data to enable the DDIO circuitry to encrypt and decrypt the DDIO data.

Example 7. This example includes the elements of example 6, wherein the I/O encryption circuitry is fabricated within the DDIO circuitry.

Example 8. This example includes the elements of example 1, wherein the accelerator circuitry and the plurality of cores are arranged within a single processor package.

Example 9. According to this example, there is provided a method. The method includes receiving data direct input output (DDIO) data with DDIO circuitry in a processor package; identifying a keyID for the DDIO data with DDIO circuitry; determine a security status associated with the keyID; and causing the DDIO data to be encrypted or decrypted based on the security status associated with the keyID.

Example 10. This example includes the elements of example 9, wherein receive DDIO data includes receiving the DDIO data from cache or from accelerator circuitry.

Example 11. This example includes the elements of example 9, wherein identify the keyID for the DDIO data includes reading a number of bits from a memory address for the DDIO data.

Example 12. This example includes the elements of example 11, wherein the number of bits are most significant bits of the memory address for the DDIO data.

Example 13. This example includes the elements of example 9, wherein the security status includes secured or unsecured.

Example 14. This example includes the elements of example 9, wherein cause the DDIO data to be encrypted or decrypted includes: transmitting an encryption request or decryption request to memory encryption circuitry.

Example 15. This example includes the elements of example 14, wherein the memory encryption circuitry is fabricated within memory controller circuitry.

Example 16. This example includes the elements of example 9, wherein cause the DDIO data to be encrypted or decrypted includes: identify an encryption key based on the keyID; apply the encryption key and an encryption algorithm to the DDIO data with I/O encryption circuitry.

Example 17. This example includes the elements of example 16, wherein the I/O encryption circuitry is fabricated within DDIO circuitry.

Example 18. According to this example, there is provided a system. The system includes accelerator circuitry to perform one or more operations on data direct input output (DDIO) data; a plurality of processor cores; cache memory communicatively coupled to one or more of the plurality of processor cores; and DDIO circuitry disposed between the cache memory and the accelerator circuitry to transfer and to secure DDIO data between the cache memory and accelerator circuitry, wherein the DDIO circuitry to encrypt and decrypt the DDIO data for the accelerator circuitry.

Example 19. This example includes the elements of example 18, wherein the accelerator circuitry is at least one of a machine learning circuitry, graphic processor unit circuitry, regular expression hardware accelerator circuitry, three-dimensional (3D) accelerator circuitry, or cryptographic accelerator circuitry.

Example 20. This example includes the elements of example 18, further comprising: memory to store instruction, which when executed by one or more of the plurality of processor cores, cause the one or more of the plurality of processor cores to perform operations, comprising: receive a bind command with a key and with a keyID; encrypt the key and the keyID with a core encryption key, in response to the bind command; receive an unwrap command; decrypt the key and the keyID; and update one or more key tables with the key and/or the keyID.

Example 21. According to this example, there is provided a computer readable device storing instructions that, if executed by one or more processors, performs the method of any one of examples 9 to 17.

Example 22. According to this example, there is provided a device comprising means to perform the method of any one of examples 9 to 17.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. An apparatus, comprising one or more processor cores to be communicatively coupled to a cache memory, the one or more processor cores to:
    encrypt a key identification (ID) and an encryption key into an encryption package unreadable by a virtual machine or a virtual machine manager;
    provide the encryption package to trusted software to cause the key ID to be programmed by the virtual machine or the virtual machine manager into a direct data input output (DDIO) circuitry to be coupled to the one or more processor cores, the DDIO circuitry configured to transfer DDIO data between the cache memory and an accelerator circuitry and to encrypt and decrypt DDIO data for the accelerator circuitry;
    after providing the encryption package to the trusted software, receive the encryption package with an unwrap command from the virtual machine or the virtual machine manager; and
    execute the unwrap command by decrypting the encryption package and by sending a cryptographic response to the virtual machine or virtual machine manager verifying that the unwrap command was successfully executed.

2. The apparatus of claim 1, wherein the one or more processor cores are to encrypt in response to executing a bind command from trusted software, the bind command including an identification or selection of the key ID and of the encryption key.

3. The apparatus of claim 2, wherein the one or more processor cores are to execute the bind command using firmware inaccessible to software programs, and to decrypt by using a key or algorithm inaccessible to software programs except through API.

4. The apparatus of claim 1, wherein the one or more processor cores are to provide the encryption package by identifying a pointer to the trusted software to cause the trusted software to access the encryption package.

5. The apparatus of claim 2, wherein at least one of the bind command or the unwrap command includes microcode and wherein a single one of the one or more processor cores is to execute the microcode.

6. The apparatus of claim 1, wherein the one or more processor cores are to provide the encryption package to the trusted software to cause the trusted software to send the encryption package to be programmed into memory encryption circuitry to enable the memory encryption circuitry to apply the key to a correct key ID during encryption and decryption operations by the one or more processor cores.

7. The apparatus of claim 6, wherein the one or more processor cores are to cause the encryption package to be programmed into one or a memory key table coupled to the memory encryption circuitry or a DDIO key table of the DDIO circuitry.

8. A method to be performed at a computing system, the method including:
    using a direct data input output circuitry (DDIO) circuitry of the system to transfer DDIO data between a cache memory of the system and an accelerator circuitry of the system, and to encrypt or decrypt DDIO data for the accelerator circuitry;

encrypting a key identification (ID) and an encryption key into an encryption package unreadable by a virtual machine or a virtual machine manager;

providing the encryption package to trusted software to cause the key ID to be programmed by the virtual machine or the virtual machine manager into the DDIO circuitry;

after providing the encryption package to the trusted software, receiving the encryption package with an unwrap command from the virtual machine or the virtual machine manager; and executing the unwrap command by decrypting the encryption package and by sending a cryptographic response to the virtual machine or virtual machine manager verifying that the unwrap command was successfully executed.

9. The method of claim 8, further including encrypting, in response to executing a bind command from trusted software, the bind command including an identification or selection of the key ID and of the encryption key.

10. The method of claim 9, wherein at least one of the bind command or the unwrap command includes microcode, the method further including using a single processor core to execute the microcode.

11. The method of claim 8, further including providing the encryption package to the trusted software to cause the trusted software to send the encryption package to be programmed into a memory encryption circuitry of the system to enable the memory encryption circuitry to apply the key to a correct key ID during encryption and decryption operations.

12. The method of claim 11, further including causing the encryption package to be programmed into one of a memory key table coupled to the memory encryption circuitry or a DDIO key table of the DDIO circuitry.

13. One or more non-transitory storage mediums having stored therein, individually or in combination, instructions that, when executed by one or more processors, perform operations including:

transferring direct data input output (DDIO) data between a cache memory and an accelerator circuitry;

encrypting or decrypting DDIO data for the accelerator circuitry;

encrypting a key identification (ID) and an encryption key into an encryption package unreadable by a virtual machine or a virtual machine manager;

providing the encryption package to trusted software to cause the key ID to be programmed by the virtual machine or the virtual machine manager into a DDIO circuitry;

after providing the encryption package to the trusted software, receiving the encryption package with an unwrap command from the virtual machine or the virtual machine manager; and executing the unwrap command by decrypting the encryption package and by sending a cryptographic response to the virtual machine or virtual machine manager verifying that the unwrap command was successfully executed.

14. The storage medium of claim 13, the operations including encrypting in response to executing a bind command from trusted software, the bind command including an identification or selection of the key ID and of the encryption key.

15. The storage medium of claim 14, the operations including executing the bind command using firmware inaccessible to software programs, and decrypting by using a key or algorithm inaccessible to software programs except through API.

16. The storage medium of claim 13, the operations including providing the encryption package by identifying a pointer to the trusted software to cause the trusted software to access the encryption package.

17. The storage medium of claim 13, the operations including providing the encryption package to the trusted software to cause the trusted software to send the encryption package to be programmed into memory encryption circuitry to enable the memory encryption circuitry to apply the key to a correct key ID during encryption and decryption operations.

18. The storage medium of claim 17, the operations including causing the encryption package to be programmed into one or a memory key table coupled to the memory encryption circuitry or a DDIO key table of the DDIO circuitry.

* * * * *